UNITED STATES PATENT OFFICE.

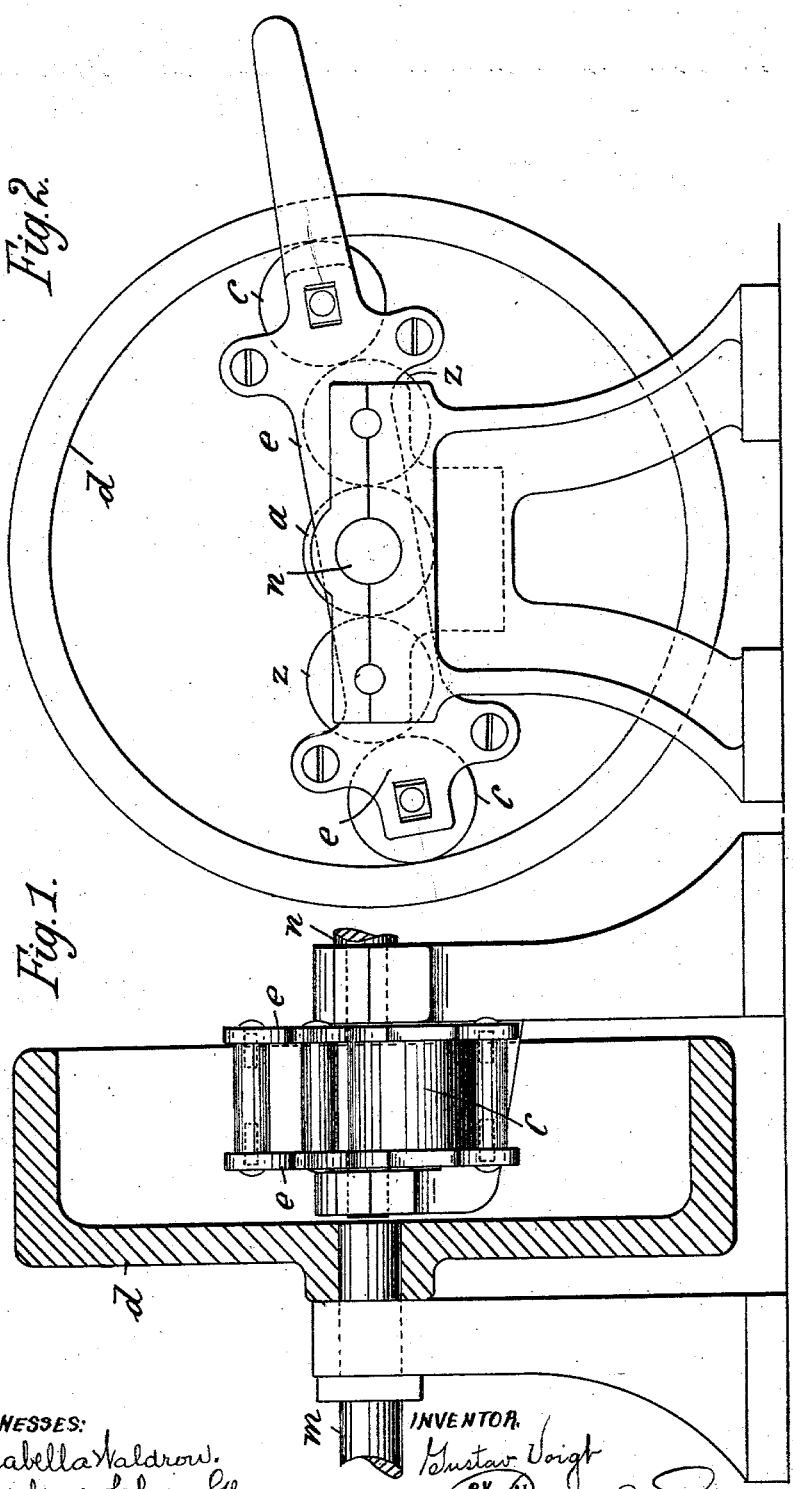

GUSTAV VOIGT, OF BERLIN, GERMANY.

FRICTION-WHEEL GEARING.

SPECIFICATION forming part of Letters Patent No. 704,721, dated July 15, 1902.

Application filed December 13, 1901. Serial No. 85,807. (No model.)

*To all whom it may concern:*

Be it known that I, GUSTAV VOIGT, engineer, of 12 Neuenburgerstrasse, Berlin, S. W., in the Empire of Germany, have invented certain new and useful Improvements in Friction-Wheel Gearing, of which the following is a full, clear, and exact specification.

The invention relates to friction-wheel gearing, the object being to provide a gear in which a strong transmission is obtained in a simple manner and which is capable of being quickly and surely thrown out of gear when required.

The invention is illustrated in the accompanying drawings, in which—

Figure 1 is a sectional elevation, and Fig. 2 is an end view.

In carrying the invention into effect in one convenient manner where two shafts $m$ $n$ in the same plane are to be coupled one to another by gearing a relatively large hollow or flanged wheel $d$ is securely attached to one of the shafts $m$ to be connected, while a smaller wheel or pulley $a$ is securely attached to the other shaft $n$ and lies within the hollow part of the larger wheel on the other shaft.

A lever $e$ is carried freely on the central smaller wheel or pulley, upon the ends of which two friction-wheels $c$ $c$ are secured symmetrically, which grip upon the inside flanges of the larger hollow wheel $d$ upon the shaft. The inner faces of these friction-wheels are connected with the central smaller wheel or pulley $a$ by means of intermediate friction-wheels $z$ $z$, arranged at both sides of the inner wheel or pulley, so that these intermediate friction-wheels are gripped between the outer friction-wheels and the inner smaller wheel or pulley before referred to. The outer friction-wheels carried upon the before-mentioned lever $e$ are supported in slide-blocks and are capable of being removed away from the hollow larger wheel, so as to render the friction-gear inoperative, which is attained when the operating-lever is brought into a sufficiently oblique position for the purpose. By moving the lever in the other direction, however, a braking action is produced, which forces the outer friction-wheels strongly against the inner faces of the flanges of the large hollow wheel, thus insuring also an intimate contact between the inner friction-wheels of the gear.

The relative transmission between the two shafts is determined alone by the proportion which exists between the diameter of the roll circle to the diameters of the hollow outer and the inner small wheel of the mechanism. If these are, for example, in the proportion of six to one, then the one shaft will run six times as fast as the other shaft.

I claim—

In combination, a shaft, a larger hollow wheel of dish shape mounted on the end thereof, a second shaft axially in line therewith, a smaller wheel carried by said second shaft within the larger wheel, a pair of smaller wheels journaled in stationary bearings and having their peripheries in contact with said smaller wheel, and a reversing-frame and a pair of small rollers journaled thereon having their peripheries in contact with the inner circumference of the large wheel and designed to contact with said pair of smaller wheels, substantially as described.

In witness whereof I have hereunto set my hand in presence of two witnesses.

GUSTAV VOIGT.

Witnesses:
HANS HEIMANN,
WOLDEMAR HAUPT.